US009628369B2

(12) United States Patent
Li et al.

(10) Patent No.: US 9,628,369 B2
(45) Date of Patent: Apr. 18, 2017

(54) DISTRIBUTING NON-UNICAST ROUTES INFORMATION IN A TRILL NETWORK

(71) Applicant: International Business Machines Corporation, Armonk, NY (US)

(72) Inventors: Fuhui Li, WuXi (CN); Jing Lu, Dazhou (CN); Jiuxing Nie, WuXi (CN); Jun Yao, Chaohu (CN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 14/702,286

(22) Filed: May 1, 2015

(65) Prior Publication Data
US 2016/0036690 A1    Feb. 4, 2016

(30) Foreign Application Priority Data
Jul. 30, 2014    (CN) .......................... 2014 1 0370601

(51) Int. Cl.
*H04L 12/721* (2013.01)
*H04L 29/08* (2006.01)
*H04L 12/751* (2013.01)

(52) U.S. Cl.
CPC ............ *H04L 45/124* (2013.01); *H04L 45/02* (2013.01); *H04L 69/324* (2013.01)

(58) Field of Classification Search
CPC .................................................. H04L 45/124
See application file for complete search history.

(56) References Cited

U.S. PATENT DOCUMENTS

2013/0301642 A1    11/2013  Radhakrishnan et al.
2014/0003285 A1*   1/2014  Jain .......................... H04L 45/66
                                                                    370/254
(Continued)

FOREIGN PATENT DOCUMENTS

CN    102946305 A    2/2013

OTHER PUBLICATIONS

Sardar, "Performance Evaluation of TRILL for Datacenter Topologies", School of Electrical Engineering and Computer Science, National Unversity of Sciences and Technology (NUST), Nov. 2013, <http://dspace.seecs.nust.edu.pk/jspuiseecs/bitstream/123456789/1003/1/thesis.pdf>.

(Continued)

*Primary Examiner* — Brian D Nguyen
*Assistant Examiner* — Toan Nguyen
(74) *Attorney, Agent, or Firm* — David B. Woycechowsky

(57) ABSTRACT

The present invention discloses a method for processing non-unicast routes information in a TRILL network and a corresponding RBridge, wherein the RBridge has a neighbor relation with a plurality of other RBridges in the TRILL network, and the RBridge is the RBridge which computes non-unicast routes information in the neighbor relation, and in the method, the RBridge executes steps of: sending an acknowledgement message to the plurality of other RBridges, wherein the acknowledgement message acknowledges that the RBridge is the RBridge which computes the non-unicast routes information; obtaining a network topology related to the non-unicast routes information in the TRILL network; computing the non-unicast routes information based on the network topology; and distributing the computed non-unicast routes information to the plurality of other RBridges. The method and the corresponding RBridge (Continued)

are capable of reducing consumption of CPU resource of RBridges in the TRILL network.

2 Claims, 6 Drawing Sheets

(56) References Cited

U.S. PATENT DOCUMENTS

| | | |
|---|---|---|
| 2014/0036682 A1 | 2/2014 | Tian et al. |
| 2014/0056178 A1 | 2/2014 | Tsai et al. |
| 2014/0071987 A1* | 3/2014 | Janardhanan ........... H04L 45/66 370/390 |
| 2014/0092780 A1* | 4/2014 | Yang .................... H04L 12/462 370/256 |
| 2014/0098703 A1 | 4/2014 | Bond et al. |
| 2014/0226525 A1* | 8/2014 | Eastlake, III .......... H04L 41/12 370/254 |
| 2014/0269746 A1* | 9/2014 | Chinthalapati ....... H04L 45/245 370/409 |

OTHER PUBLICATIONS

Chinese Patent Application No. 201410370601.1, filed on Jul. 30, 2014.

* cited by examiner

-- Prior Art --

| TYPE | (1 BYTE) |
|---|---|
| LENGTH | (1 BYTE) |
| MASTER COMPUTE NODE NICKNAME | (2 BYTES) |
| SLAVE COMPUTE NODE NICKNAME | (2 BYTES) |

FIG. 5

| ROLE- APPOINTMENT | (1 BYTE) |
|---|---|
| 20 | (1 BYTE) |
| R6 | (2 BYTES) |
| R5 | (2 BYTES) |

FIG. 6

| TYPE | | (1 BYTE) |
|---|---|---|
| LENGTH | | (1 BYTE) |
| RESV | COMPUTE NODE ROLE FLAG | (1 BYTE) |

FIG. 7

| NICKNAME | NEIGHBOR COUNT | NEIGHBOR NICKNAME... | (4 +NEIGHBOR COUNT *2)

| ROUTES-INFO | | | (1 BYTE) |
| --- | --- | --- | --- |
| 44 | | | (1 BYTE) |
| R1 | 5 | R2,R3,R4,R5,R6 | (14 BYTES) |
| R2 | 5 | R1,R3,R4,R5,R6 | (14 BYTES) |
| R3 | 5 | R1,R2,R4,R5,R6 | (14 BYTES) |
| R4 | 5 | R1,R2,R3,R5,R6 | (14 BYTES) |

DISTRIBUTING NON-UNICAST ROUTES INFORMATION IN A TRILL NETWORK

BACKGROUND

The present invention relates to communication network, and more particularly, to a method for distributing non-unicast routes information in a TRILL network and a corresponding RBridge.

Transparent Interconnection of Lots of Links (TRILL) is a link state algorithm based routing protocol on a Layer-2 network. A TRILL network established by using that protocol comprises Routing Bridges (RBridges) having a routes forwarding feature, each RBridge obtains the entire network topology by running an extended Intermediate System to Intermediate System Routing (IS-IS) Protocol, and computes routes information through a Short Path First (SPF) algorithm.

FIG. 2 shows an exemplary structure of a TRILL network. According to FIG. 2, its basic communication procedure is as follows: routes information computed by each RBridge through SPF algorithm constitutes a routes table to be used in forwarding packet. When a RBridge RB-A receives a packet from Host 1 and needs to forward the same to Host 2 through the TRILL network, the packet is encapsulated into a TRILL packet header, which comprises an Ingress RBridge for entering into the TRILL network, i.e., RB-A in FIG. 2, and an Egress RBridge for leaving the TRILL network, i.e., RB-C in FIG. 2, also known as destination RBridge, used for finding routes in the TRILL network. After the TRILL packet is forwarded from RB-A to RB-B according to the routes information, it is further forwarded from RB-B to RB-C according to the routes information; when it is found at RB-C that the local RBridge is the same as the Egress RBridge, then it is determined that the TRILL packet has reached the last-hop RBridge in the forwarding path, at which time the TRILL packet header needs to be stripped, and a conventional Layer-2 forwarding is executed, to eventually forward the data packet to Host 2.

During the above communication procedure, after a physical connection of the TRILL network as shown in FIG. 2 has been established, each RBridge needs to obtain link state information of the entire network to obtain the network topology, and to compute routes information through the SPF algorithm; when structure of the TRILL network changes, each RBridge needs to re-obtain network topology of the entire network, and re-compute routes information through the SPF algorithm; furthermore, even if there is no change in the network, each RBridge needs to periodically re-compute routes information through the SPF algorithm. Such computation will consume a lot of CPU resources of the RBridge, which may cause various services running at the RBridge being affected.

SUMMARY

According to one aspect of the present invention, there is provided a method for processing non-unicast routes information in a Transparent Interconnection of Lots of Links (TRILL) network, wherein a Routing Bridge (RBridge) having a routes forwarding feature and a plurality of other RBridges have a neighbor relation in the TRILL network, and the RBridge is a RBridge which computes non-unicast routes information in the neighbor relation, and in the method, the RBridge executes steps of sending an acknowledgement message to the plurality of other RBridges, wherein the acknowledgement message acknowledges that the RBridge is the RBridge which computes the non-unicast routes information. The method includes obtaining a network topology related to the non-unicast routes information in the TRILL network and computing the non-unicast routes information based on the network topology. The method then includes distributing the computed non-unicast routes information to the plurality of other RBridges.

According to another aspect of the present invention, there is provided a Routing Bridge (RBridge) having a routes forwarding feature for processing non-unicast routes information in a Transparent Interconnection of Lots of Links (TRILL) network, wherein the RBridge and a plurality of other RBridges have a neighbor relation in the TRILL network, and the RBridge is a RBridge which computes the non-unicast routes information in the neighbor relation, the RBridge including an acknowledgement message sending module configured to send an acknowledgement message to the plurality of other RBridges, wherein the acknowledgement message acknowledges that the RBridge is the RBridge which computes the non-unicast routes information. The RBridge includes a network topology obtaining module configured to obtain a network topology related to the non-unicast routes information in the TRILL network and a routes information computing module configured to compute the non-unicast routes information based on the network topology. The RBridge also includes a routes information distributing module configured to distribute the computed non-unicast routes information to the plurality of other RBridges.

The method and the apparatus provided in the present invention are capable of reducing consumption of CPU resource of RBridges in the TRILL network.

BRIEF DESCRIPTION OF THE SEVERAL VIEWS OF THE DRAWINGS

FIG. 5 shows a TLV format for propagating an appointed compute RBridge to other RBridges in a neighbor relation;

FIG. 6 shows notification of TLV message content by R6 in FIG. 4;

FIG. 7 shows an acknowledge TLV format sent after a compute RBridge is appointed as a compute RBridge;

DETAILED DESCRIPTION

Through the more detailed description of some embodiments of the present disclosure in the accompanying drawings, the above and other objects, features and advantages of the present disclosure will become more apparent, wherein the same reference generally refers to the same components in the embodiments of the present disclosure. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
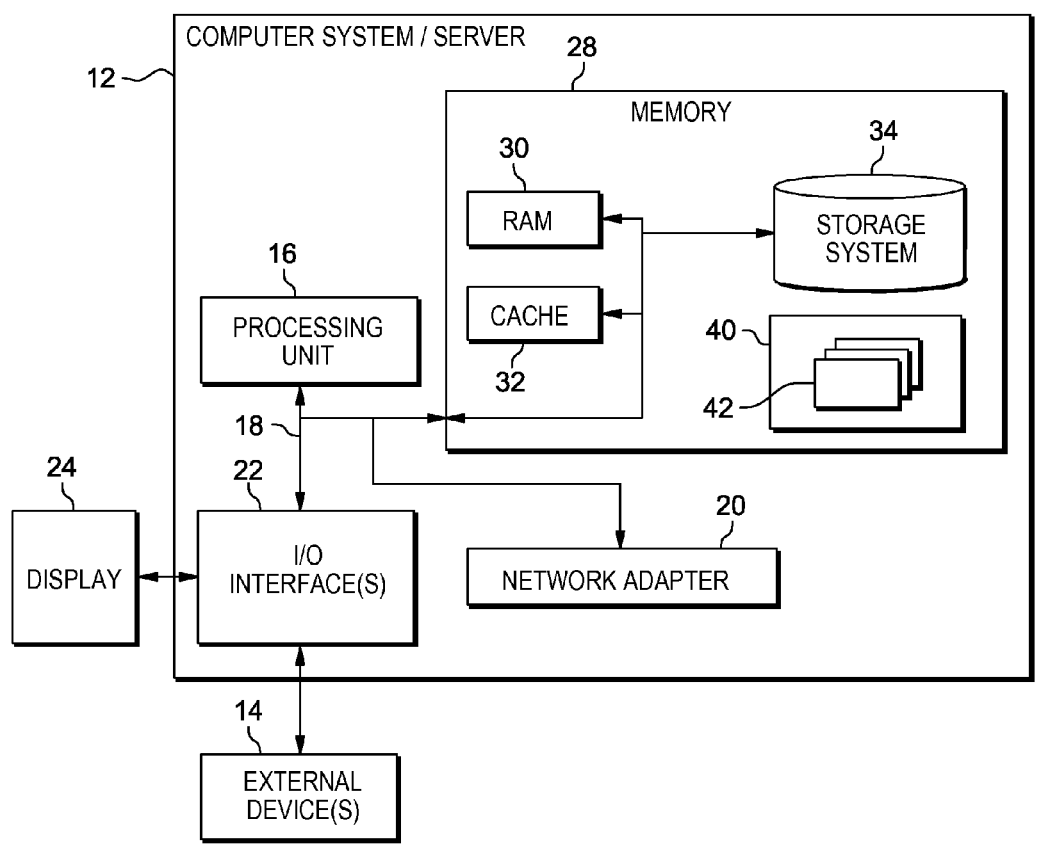
FIG. 1 shows a block diagram of an exemplary computer system/server which is applicable to implement the embodiments of the present invention.
Figure 2:
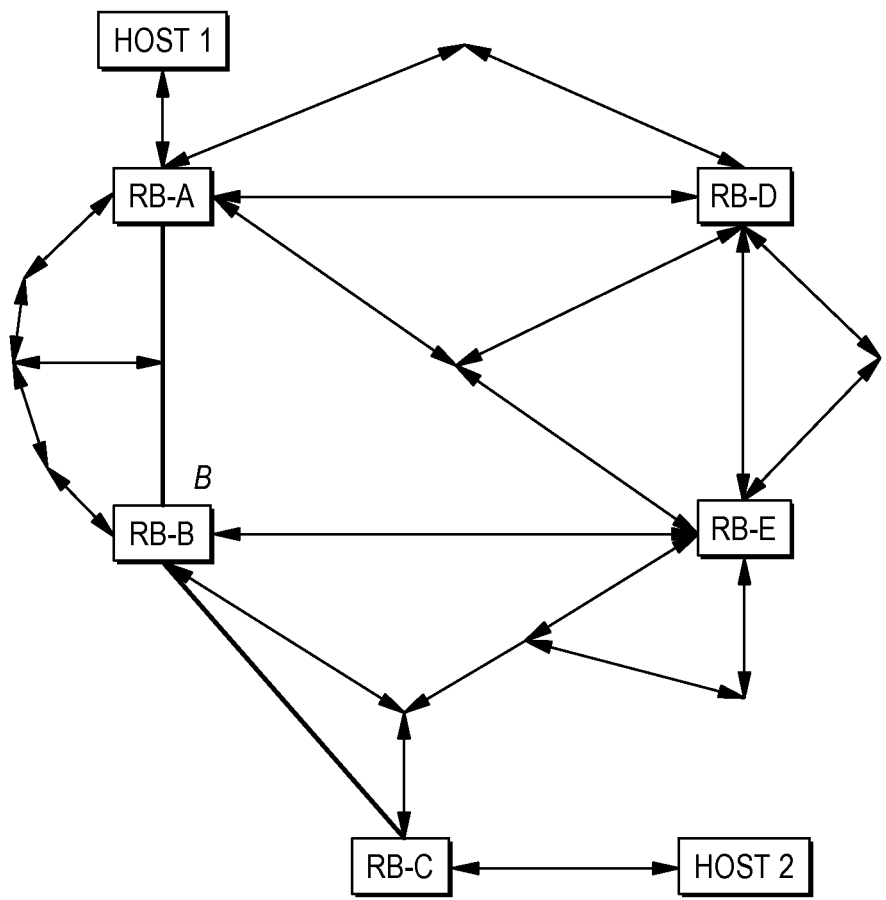
FIG. 2 shows a structural diagram of an exemplary TRILL network.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing unit(s) 16, a memory 28, and a bus 18 that couples various system components including memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache 32. Computer system/server 12 may further include other removable/non-removable, volatile/non-volatile computer system storage media. For example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

SPF algorithm is a general-purpose algorithm for computing routes information. The algorithm needs to compute which paths are available from a local node to a destination node, how much it costs, and there may be a plurality of paths; then select the best from the information of the plurality of paths, and select an optimal egress interface and the next hop as routes information. It is seen that, a SPF algorithm computes routes without distinguishing between types of traffic.

During the process of computing routes through SPF algorithm in a TRILL network, for various traffic types, different routes tables will be computed, that is, for a unicast traffic type, a unicast routes table may be computed, for a multicast traffic type and a broadcast traffic type, a non-unicast routes table will be computed. For example, when computing a unicast routes table, each RBridge computes, with respect to the network topology consisting of itself as a root node, through the SPF algorithm so as to compute routes information, so the network topology used in the computation by respective RBridges are different, therefore, unicast routes tables computed by respective RBridges are also different. However, as to computation of non-unicast routes table, root nodes of the network topology used by each RBridge are a number of elected RBridges, and the network topologies being a number of trees with these root nodes as root; therefore, within the range of all the RBridges covered by election, network topologies used thereby are the same, and the routes information computed thereby are also the same, thus, there is no need to let each RBridge compute several pieces of non-unicast routes information for serving the multicast and the broadcast as in the prior art, rather, non-unicast routes information may be computed only by a specific RBridge, and then all the RBridges within scope of the election are informed, which is the basic idea of the invention. By computing multicast and broadcast routes information in this way, a substantial number of RBridges may be dispensed with computation of non-unicast routes information, which will save a large amount of CPU resources.

Figure 3:
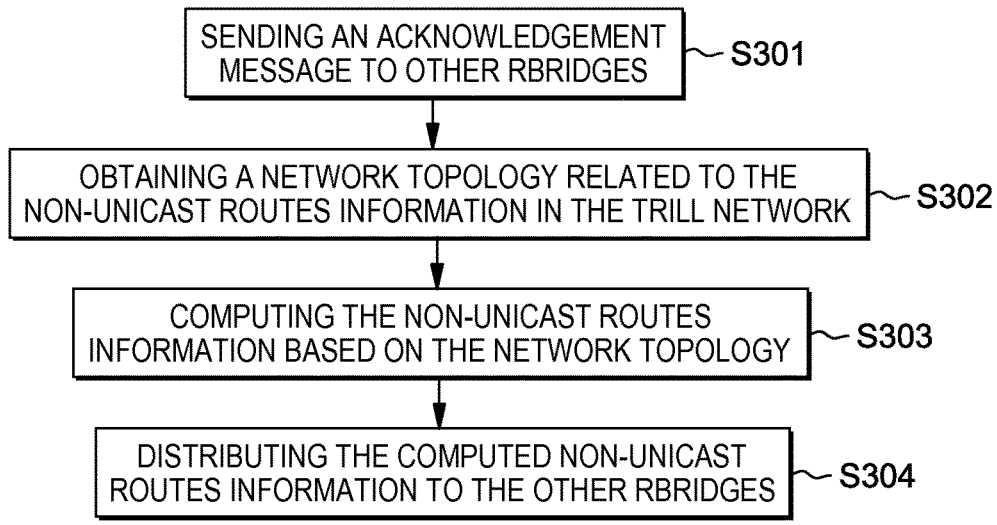
FIG. 3 shows a flowchart of a method for processing non-unicast routes information in a TRILL network.

According to one embodiment of the present invention, there is disclosed a method for processing non-unicast routes information in a Transparent Interconnection of Lots of Links (TRILL) network, wherein a Routing Bridge (RBridge) having a routes forwarding feature has a neighbor relation with other RBridges in the TRILL network, and the RBridge is a RBridge which computes non-unicast routes information in the neighbor relation; FIG. 3 shows a flowchart of a method for processing non-unicast routes information in a TRILL network; according to FIG. 3, in the method, the RBridge executes steps of:

Step S301: sending an acknowledgement message to the other RBridges, wherein the acknowledgement message acknowledges that the RBridge is the RBridge which computes the non-unicast routes information;

Step S302: obtaining a network topology related to the non-unicast routes information in the TRILL network;

Step S303: computing the non-unicast routes information based on the network topology; and Step S304: distributing the computed non-unicast routes information to the other RBridges.

In the above method, the other RBridges having a neighbor relation with the RBridge can obtain non-unicast routes information from the RBridge without having to compute the non-unicast routes information, which can save CPU resource thereof.

Figure 4:
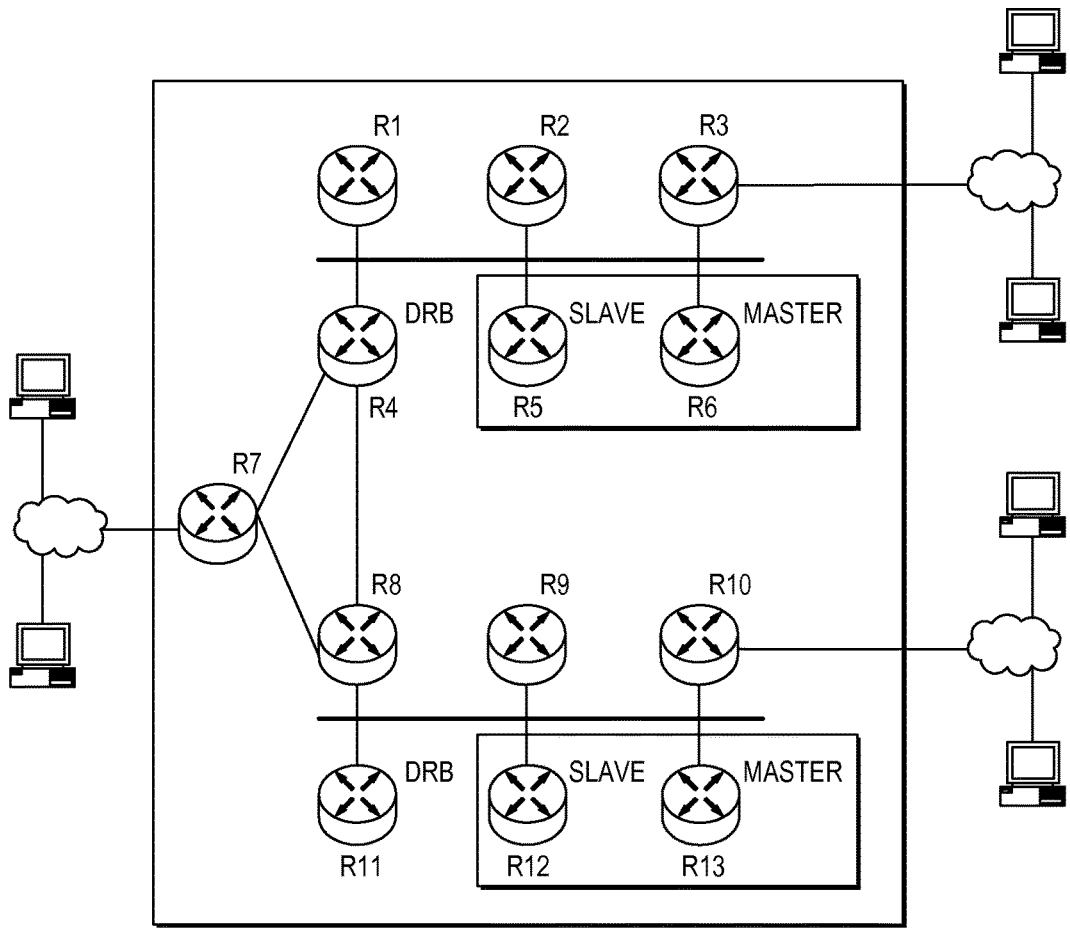
FIG. 4 shows a schematic diagram of forming a neighbor relation by a plurality of RBridges of a TRILL network.

In one embodiment, the neighbor relation may be defined according to a connection relation of the TRILL network, and a same network may define different neighbor relations. FIG. 4 shows a diagram of forming a neighbor relation by a plurality of RBridges of a TRILL network; in FIG. 4, R1, R2, R3, R4, R5 and R6 are located on a same link, and in one embodiment, the RBridges having a neighbor relation are located on one link in a TRILL network. In other words, R1-R6 composes a neighbor relation. Similarly, R8-R13 also composes a neighbor relation. Of course, the neighbor relation may also be defined by a network administrator, for example, R1-R13 may be defined as a neighbor relation.

In the prior art, a RBridge in the neighbor relation discovers a neighbor RBridge in the TRILL network by exchanging a Hello packet, and each RBridge knows that it is the neighbor of all other RBridges on the same link. A Hello packet is mainly used for discovering and keeping-alive of a TRILL neighbor, which typically includes some compulsory and optional conditions for forming the neighbor relation. All the information is encoded in the Hello packet in form of TLV. All RBridges with enabled TRILL interfaces will send a Hello packet. The Hello packet will be exchanged periodically among neighbors. TLV is a way of expressing information in a packet, and the TLV respectively represents Type, Length, and Value. The sender and receiver have agreed that information in the packet is encoded in form of TLV, and the receiver will parse the packet in form of TLV after receiving the packet.

In one embodiment of the present invention, the RBridge is appointed by a Designated RBridge (hereinafter referred to as DRB for short) with a routes forwarding feature in the neighbor relation as a RBridge with a routes forwarding feature which computes non-unicast routes information (hereinafter referred to as compute RBridge for short). In the prior art, among a plurality of RBridges with the neighbor relation, DRB may be obtained by election. Then in the present invention, the elected DRB appoints the RBridge which computes the non-unicast routes information in the neighbor relation. Specifically how to elect has been specified in RFC, that is, electing a RBridge with higher interface priority as the DRB by comparing priorities of respective RBridge interfaces, which belongs to prior art and will not be repeated here. In the following description, it is assumed that in the neighbor relation formed by a link of R1-R6, R4 is elected as the DRB. In another embodiment, among a plurality of RBridges having a neighbor relation, the DRB may be appointed by a system administrator. Then, the DRB appoints the compute RBridge in a manner as described above. In addition, the appointment is encoded by the DRB in a packet and propagated to the other RBridges. How to propagate will be described in detail hereinafter.

In still another embodiment, the RBridge is appointed as the compute RBridge by receiving a command. For example, a system administrator may use a command in a certain RBridge to appoint that compute RBridge as a compute RBridge. The appointment is encoded in a packet by that RBridge and propagated to the other RBridges. How to propagate will be described in detail hereinafter.

In the above embodiment, whether the computing RBridge is appointed by the DRB, or the computing RBridge is appointed by receiving a command in that RBridge, in response to that the neighbor relation includes more than three RBridges, two computing RBridges may be appointed in the neighbor relation, one being a master computing RBridge, and the other being a slave computing RBridge. Typically, the master computing RBridge is responsible for computing non-unicast routes information and sending the non-unicast routes information to the other RBridges (excluding the slave computing RBridge) in the neighbor relation; the slave computing RBridge also computes the non-unicast routes information, but in case that the master computing RBridge is working, it does not send the non-unicast routes information to the other RBridges in the neighbor relation. In case that the master computing RBridge is unavailable, e.g., failed, the slave computing RBridge will take the place of the master computing RBridge to undertake the work of computing and sending the non-unicast routes information.

In the embodiment in which the computing RBridge is appointed by the DRB, the DRB may propagate the appointed computing RBridge to other RBridges in the neighbor relation, one propagation manner may utilize a Hello packet, and specifically, information of the appointed computing RBridge is encoded by the DRB in TLV of the Hello packet. FIG. 5 shows a TLV format for propagating an appointed computing RBridge to other RBridges in a neighbor relation; in FIG. 5, Type represents type of the TLV, which may be defined as Role-Appointment, Length represents length of the TLV, wherein Master computing node appointment and Slave computing node appointment are just values in the TLV, which respectively represent nicknames of the master computing RBridge and the slave computing RBridge.

Regarding to FIG. 4, R4 is the DRB, R4 appoints R6 as a master computing RBridge, R5 is a slave computing RBridge, and the other RBridges including R1, R2, R3 and R4 are non-computing RBridges, FIG. 6 shows notification of TLV message content by R6 in FIG. 4.

In the embodiment in which the computing RBridge is appointed by a command, a system administrator may appoint the master computing RBridge and the slave computing RBridge by using a command "Compute-node role <Master, Slave>", and synchronize information of the slave computing RBridge on the master computing RBridge by a command "Slave nickname xxxx", and synchronize information of the master computing RBridge on the slave computing RBridge by a command "Master nickname yyyy". For example, in the neighbor relation formed by R1-R6 in FIG. 4, the following commands may be configured on R6: "Compute-node role Master" and "Slave nickname R5" to inform R6 that it is the master computing RBridge and that the slave computing RBridge is R5, and similar commands can be configured on R5. In addition, the RBridge appointed by the master computing RBridge to compute the non-unicast routes information is encoded by the master computing RBridge in a Hello packet and the packet is propagated to other RBridges in the neighbor relation, encoding format used is the same as that described in FIG. 5, and manner of propagation is the same as that of DRB propagation, which will not be repeated here.

Of course, those skilled in the art will appreciate that, the above process of propagating appointment information to other RBridges in the neighbor relation by using TLV of a Hello packet is just a specific embodiment, and it is entirely possible for those skilled in the art to define a propagation manner that uses other types of packet by referring to the above embodiment, such as using a LSP packet or a SNP packet, those skilled in the art can even define a separate packet to propagate the above information, which will not be repeated herein.

In one embodiment, the RBridge appointed to compute the non-unicast routes information is not an edge RBridge, but an transit RBridge, for example, in the above neighbor relation of R1-R6, R4 and R3 are edge RBridges, which cannot be the RBridge for computing the non-unicast routes information, and the RBridge for computing the non-unicast routes information can only be at least one of R1, R2, R5 and R6.

In one embodiment, availability of the master computing RBridge and/or the slave computing RBridge should be detected. Once it is detected that the master computing RBridge and/or the slave computing RBridge is (are) unavailable, a timer may be started to wait for recovery of the computing RBridge. If the RBridge cannot recover, in response to that only the master computing RBridge or only the slave computing RBridge fails to recover, a new slave computing RBridge may be appointed; in response to that both the master computing RBridge and the slave computing RBridge fail to recover, a new master computing RBridge and a new slave computing RBridge may be appointed. The above steps may be executed by the DRB, or executed by some RBridge as appointed by the system administrator through a command.

In one embodiment, availability of the master computing RBridge should be detected by the slave computing RBridge. In response to that the slave computing RBridge detects that the master computing RBridge is unavailable, the slave computing RBridge will send the computed non-unicast routes information to the RBridges in the neighbor relation.

In one embodiment, after the master computing RBridge and/or the slave computing RBridge is (are) appointed as the computing RBridge(s), in step S301, a master role or slave role acknowledgement message will be sent to the neighbor RBridges in the neighbor relation. The acknowledgement message may also utilize a role-acknowledgement sub-TLV of the Hello packet or other types of packet such as a LSP packet or a SNP packet, and it is even possible to define an acknowledgement packet separately. FIG. 7 shows an acknowledgement TLV format after a computing RBridge is appointed as the computing RBridge. In FIG. 7, type of the TLV is Role-Ack, representing role acknowledgement; "Computing node role flag" may be 1 or 0, for example, 1 may be defined as the master computing RBridge, 0 is the slave computing RBridge, or vice versa. Because the above message is encoded in a Hello packet, and the Hello packet per se is identified by a nickname, so a neighbor RBridge knows which RBridge has sent the Hello packet upon reception; of course, from the parsed message, it is also known who is sending the role acknowledgement message.

Figure 8:
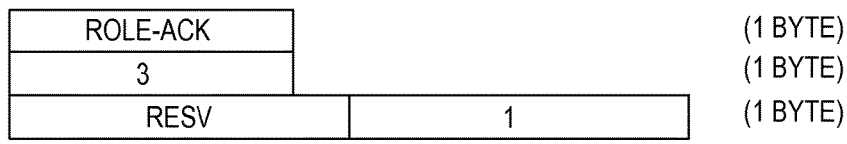
FIG. 8 shows an acknowledgement message sent by R6.
Figure 9:
FIG. 9 shows an acknowledgement message sent by R5.

Regarding to FIG. 4, R6 is the master computing RBridge, and R5 is the slave computing RBridge. Other RBridges, including R1, R2, R3 and R4, are non-computing RBridges, the acknowledgement message sent by R6 is as shown in FIG. 8. The acknowledgement message sent by R5 is as shown in FIG. 9.

In step S302 and step S303, methods in prior art can be adopted for the computing RBridge to obtain network topology of the TRILL network related to the non-unicast routes information and to compute the non-unicast routes information according to the network topology, wherein network topology related to the non-unicast routes information in the TRILL network is a tree with several nodes elected from the entire network as the root nodes, and computing the non-unicast routes information according to the network topology may be performed by the SPF algorithm in prior art. For example, for R5 and R6 in FIG. 4, assuming that three trees need to be computed, both R5 and R6 will compute these three trees, but only R6 will send the routes information to the neighbor RBridges. R5 computes the routes information but does not send it.

The computed non-unicast routes information is distributed to the other RBridges in step S304; in one embodiment, the master computing RBridge may distribute the non-unicast routes information by using a LSP packet, LSP is a link state packet in TRILL protocol and is mainly used to advertise link state information of a present node to the entire network, so as to facilitate other RBridges to compute routes to that present RBridge. Specific format of a LSP consists of an LSP packet header and a number of TLVs. Specifically, TLV format in a LSP packet shown in FIG. 10 may be used as a message format to distribute the non-unicast routes information.

Figure 10:
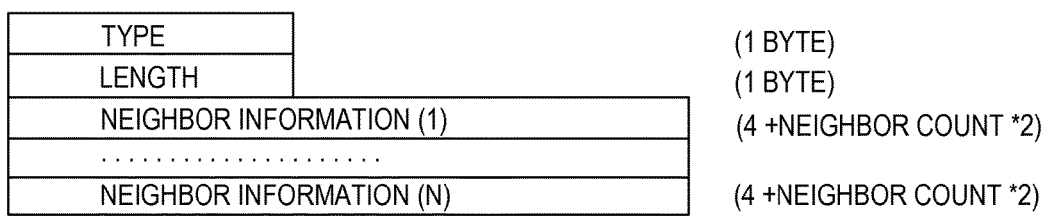
FIG. 10 shows a TLV format in a LSP packet as a message format for distributing non-unicast routes information.
Figures 11, 12, 13:
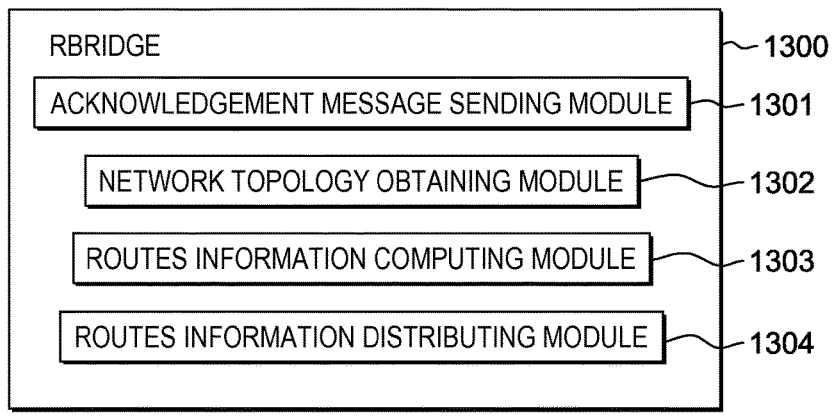
FIG. 11 shows content included within neighbor information in FIG. 10.
FIG. 12 shows routes information sent by R6.
FIG. 13 shows a structural block diagram of an RBridge in a TRILL network.

In FIG. 10, TLV type is defined as ROUTES-INFO; FIG. 11 shows content included in Neighbor Information in FIG. 10; that is, including neighbor Nickname of the RBridge, NeighborCount of neighbor RBridges, NeighborNickname of neighbor RBridges. Regarding to FIG. 4, the routes information sent by R6 is as shown in FIG. 12.

Other RBridges in the neighbor relation, for example, R1-R4 in FIG. 4, receive the non-unicast routes information shown in FIG. 12 as distributed by R6, parse the non-unicast routes information directed to themselves, for example, R1 only needs to parse the information in the third line of FIG. 12, R2 only needs to parse the information in the fourth line of FIG. 12, and so on, then the non-unicast routes information can be obtained without computation, which saves CPU resources thereof.

Those skilled in the art will appreciate that, the master compute RBridge may also distribute the non-unicast routes information by using other types of packet, for example, a Hello packet or a SNP packet, and it is even possible to define a distribution packet separately, embodiments thereof are similar and will not be repeated herein.

Under a same inventive conception, the present invention further discloses a network bridge (RBridge) having a routing forwarding feature for processing non-unicast routes information in a Transparent Interconnection of Lots of Links (TRILL) network, wherein the RBridge and other RBridges have a neighbor relation in the TRILL network, and the RBridge is a RBridge which computes non-unicast routes information in the neighbor relation; FIG. 13 shows a structural block diagram of a RBridge 1300 in a TRILL network. According to FIG. 13, the RBridge comprises: an acknowledgement message sending module 1301 configured to send an acknowledgement message to the other RBridges, wherein the acknowledgement message acknowledges that the RBridge is the RBridge which computes the non-unicast routes information; an network topology obtaining module 1302 configured to obtain a network topology related to the non-unicast routes information in the TRILL network; a routes information computing module 1303 configured to compute the non-unicast routes information based on the network topology; and a routes information distributing module 1304 configured to distribute the computed non-unicast routes information to the other RBridges.

In one embodiment, the other RBridges do not compute the non-unicast routes information.

In one embodiment, the RBridge and the other RBridges are located on one Link of the TRILL network.

In one embodiment, the RBridge is appointed by a Designated RBridge (DRB) with a routing forwarding feature in the neighbor relation as the RBridge which computes the non-unicast routes information, and the appointment is encoded by the DRB in a packet and propagated to the other RBridges.

In one embodiment, the RBridge is appointed as the RBridge which computes the non-unicast routes information by receiving a command, and the appointment is encoded in a packet by the RBridge and propagated to the other RBridges.

In one embodiment, the RBridge is not an edge RBridge.

In one embodiment, in the TRILL network, in response to that the neighbor relation includes at least three RBridges, the RBridge included in the neighbor relation is a master computing RBridge, the neighbor relation further includes a slave computing RBridge and the other RBridges, the slave computing RBridge computes the non-unicast routes information, and in case that the master computing RBridge is working, the slave computing RBridge does not send the non-unicast routes information to the other RBridges.

In one embodiment, in the TRILL network, in response to that the slave computing RBridge detects that the master computing RBridge is unavailable, the slave computing RBridge sends the non-unicast routes information to the other RBridges.

In one embodiment, in the TRILL network, availability of both the master computing RBridge and the slave computing RBridge are detected, in response to that only the master computing RBridge or only the slave computing RBridge is unavailable, a new slave computing RBridge is appointed; in response to that both the master computing RBridge and the slave computing RBridge are unavailable, a new master computing RBridge and a new slave computing RBridge are appointed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts appointed in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act appointed in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts appointed in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the appointed logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the appointed functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing non-unicast routes information in a Transparent Interconnection of Lots of Links (TRILL) network, wherein a Routing Bridge (RBridge) having a routing forwarding feature and a plurality of other RBridges have a neighbor relation in the TRILL network, and the RBridge is a RBridge which computes non-unicast routes information in the neighbor relation, and in the method, the RBridge executes steps of:
    sending an acknowledgement message to the plurality of other RBridges, wherein the acknowledgement message acknowledges that the RBridge is the RBridge which computes the non-unicast routes information;
    obtaining a network topology related to the non-unicast routes information in the TRILL network;
    computing the non-unicast routes information based on the network topology; and
    distributing the computed non-unicast routes information to the plurality of other RBridges;
    wherein:
    the RBridge is appointed by a Designated RBridge (DRB) with a routing forwarding feature in the neighbor relation as the RBridge which computes the non-unicast routes information, and the appointment is encoded by the DRB in a packet and propagated to the plurality of other RBridges;
    in the TRILL network, in response to that the neighbor relation includes at least three RBridges, the RBridge included in the neighbor relation is a first master computing RBridge, the neighbor relation further includes a first slave computing RBridge and the plurality of other RBridges; and wherein the first slave computing RBridge computes the non-unicast routes information, and in case that the first master computing RBridge is working, the first slave computing RBridge does not send the non-unicast routes information to the plurality of other RBridges;
    in the TRILL network, in response to that the first master computing RBridge is unavailable, the first slave computing RBridge sends the non-unicast routes information to the plurality of other RBridges; and
    in the TRILL network, in response to that only the first master computing RBridge or only the first slave computing RBridge is unavailable, a second slave computing RBridge is appointed; and in response to that both the first master computing RBridge and the first slave computing RBridge are unavailable, a second master computing RBridge and a second slave computing RBridge are appointed.

2. A Routing Bridge (RBridge) having a routing forwarding feature for processing non-unicast routes information in a Transparent Interconnection of Lots of Links (TRILL) network, wherein the RBridge and a plurality of other RBridges have a neighbor relation in the TRILL network, and the RBridge is a RBridge which computes the non-unicast routes information in the neighbor relation, the RBridge comprising:
    an acknowledgement message sending module configured to send an acknowledgement message to the plurality of other RBridges, wherein the acknowledgement message acknowledges that the RBridge is the RBridge which computes the non-unicast routes information;
    an network topology obtaining module configured to obtain a network topology related to the non-unicast routes information in the TRILL network;
    a routes information computing module configured to compute the non-unicast routes information based on the network topology; and
    a routes information distributing module configured to distribute the computed non-unicast routes information to the plurality of other RBridges;
    wherein:
    the RBridge is appointed by a Designated RBridge (DRB) with a routing forwarding feature in the neighbor relation as the RBridge which computes the non-unicast routes information, and the appointment is encoded by the DRB in a packet and propagated to the plurality of other RBridges;
    in the TRILL network, in response to that the neighbor relation includes at least three RBridges, the RBridge included in the neighbor relation is a first master computing RBridge, the neighbor relation further includes a first slave computing RBridge and the plurality of other RBridges, the first slave computing RBridge computes the non-unicast routes information, and in case that the first master computing RBridge is working, the first slave computing RBridge does not send the non-unicast routes information to the plurality of other RBridges;

in the TRILL network, in response to that the first master computing RBridge is unavailable, the first slave computing RBridge sends the non-unicast routes information to the plurality of other RBridges; and in the TRILL network, in response to that only the first master computing RBridge or only the first slave computing RBridge is unavailable, a second slave computing RBridge is appointed; in response to that both the first master computing RBridge and the first slave computing RBridge are unavailable, a second master computing RBridge and a second slave computing RBridge are appointed.

* * * * *